United States Patent
Yin et al.

(10) Patent No.: US 8,977,112 B2
(45) Date of Patent: Mar. 10, 2015

(54) MEDIA CONTENT RECORDING, MANAGEMENT, AND DISTRIBUTION SYSTEMS AND METHODS

(75) Inventors: Fenglin Yin, Lexington, MA (US); Jack Jianxiu Hao, Lexington, MA (US); Zhiying Jin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 483 days.

(21) Appl. No.: 13/282,940

(22) Filed: Oct. 27, 2011

(65) Prior Publication Data

US 2013/0108245 A1    May 2, 2013

(51) Int. Cl.
*H04N 5/76* (2006.01)
*H04N 21/433* (2011.01)

(52) U.S. Cl.
CPC .................................. *H04N 21/4334* (2013.01)
USPC ......................................................... 386/291

(58) Field of Classification Search
CPC ............ H04N 5/782; H04N 21/47214; H04N 21/4334; H04N 5/76; H04N 5/765
See application file for complete search history.

(56) References Cited

U.S. PATENT DOCUMENTS

| | | | | |
|---|---|---|---|---|
| 2010/0268779 | A1* | 10/2010 | Rao | 709/206 |
| 2011/0292280 | A1* | 12/2011 | Sloo | 348/465 |
| 2012/0011527 | A1* | 1/2012 | Fan et al. | 725/9 |
| 2012/0047534 | A1* | 2/2012 | Gharachorloo et al. | 725/53 |

* cited by examiner

*Primary Examiner* — William C Vaughn, Jr.
*Assistant Examiner* — Daniel Tekle

(57) ABSTRACT

Exemplary media content recording, management, and distribution systems and methods are disclosed. An exemplary method includes a media content provider subsystem providing an online recording manager service for access by a user, providing an online content management service for access by the user, receiving, through the online recording manager service, a recording request initiated by the user to record a television content program, and publishing, in response to the recording request received through the online recording manager service, a recording of the television content program to the online content management service for hosted access by the user through the online content management service. Corresponding systems and methods are also disclosed.

21 Claims, 7 Drawing Sheets

MEDIA CONTENT RECORDING, MANAGEMENT, AND DISTRIBUTION SYSTEMS AND METHODS

BACKGROUND INFORMATION

Certain consumer electronic devices include a digital video recorder ("DVR") application capable of recording a live transmission (e.g., a broadcast or multicast) of a television program to local storage for subsequent access and viewing by users of the devices. For example, a DVR-equipped user device, such as a set-top box that includes a DVR application, may be used by a user to record a television program to local memory and to access and view the locally-stored recording of the television program in a time-shifted manner.

Such architectures for local recording of television programs have certain limitations. For example, a DVR-equipped user device typically has limited resources that impose limitations on the number of television programs that can be recorded simultaneously by the device and/or the amount of recorded television content data that can be stored by the device. In addition, user options for accessing or otherwise using television programs recorded locally by a DVR-equipped user device are limited. For example, the user may be limited to accessing recorded television programs only from the same DVR-equipped user device and/or device platform that recorded the television programs.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
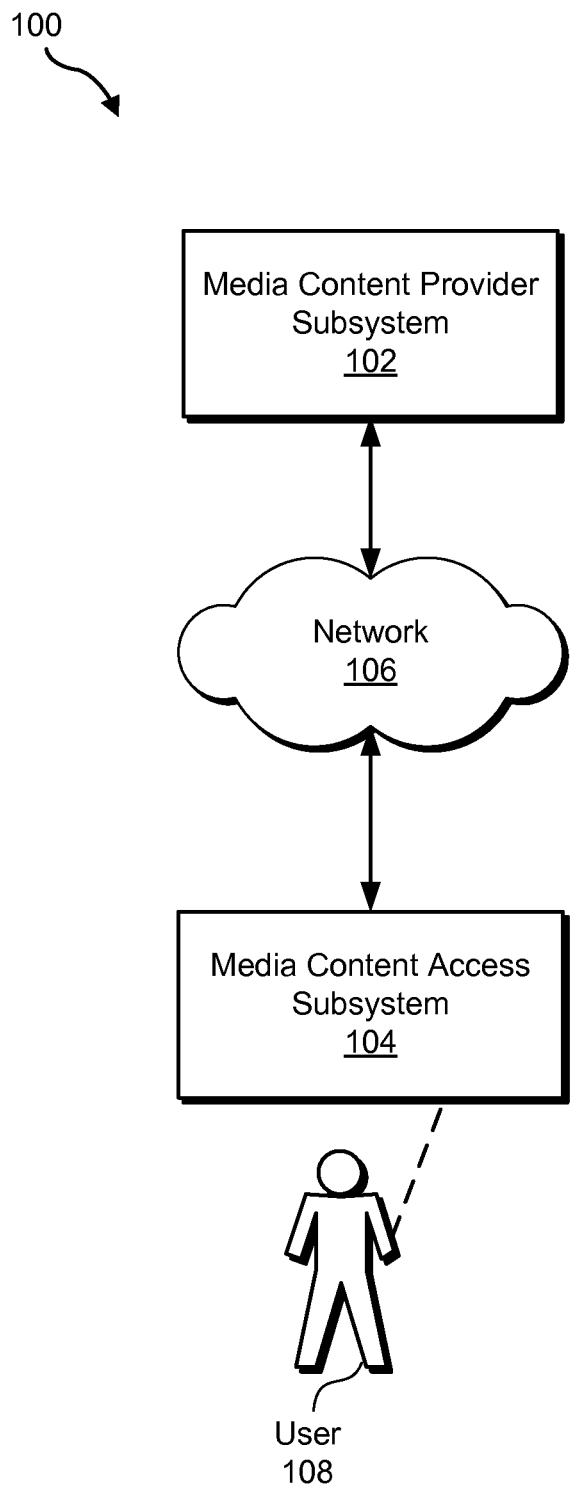
FIG. 1 illustrates an exemplary media content distribution system according to principles described herein.

Exemplary media content recording, management, and distribution systems and methods are disclosed herein. In certain exemplary systems and methods described herein, a media content provider subsystem 1) provides a recording manager service for access by a user, 2) provides a content management service for access by the user, 3) receives, through the recording manager service, a recording request initiated by the user to record a media content program, and 4) publishes, in response to the recording request received through the recording manager service, a recording of the media content program to the content management service for hosted access by the user through the content management service. The user may use any user device associated with the user and configured to access the content management service to access (e.g., playback, manage, delete, etc.) the recording of the media content program by way of the content management service.

As used herein, the term "media content program" refers to an instance of media content that may be presented (e.g., played back) by a user device over time for experiencing by a user. For example, a media content program may include a television program, a movie, an audio program, a song, an audio book, a radio broadcast program, a video program, and/or an audio/video program. Typically, such a media content program has a finite duration (e.g., a presentation of the media content program lasts a finite length of time).

One or more services provided by the exemplary system and methods described herein may be referred to as "online" or "hosted" services. This may refer to the services, including a recording manager service (e.g., a remote DVR manager service) and a content management service described herein, as being provided by one or more remote sources for access by one or more users over one or more data communication networks. For example, the services may be provided by one or more server computing devices as cloud-based services that may be accessed by one or more user devices over a data communication network such as the Internet.

By publishing recorded media content programs to an online content management service for user access, as described herein, the exemplary systems and methods described herein may provide a media content recording, management, and distribution architecture that allows users to conveniently obtain access to and/or manage recorded media content programs without being restricted by one or more of the limitations associated with conventional local DVR architectures. Exemplary media content recording, management, and distribution architectures described herein may provide efficiency, scalability, and/or one or more new features not provided by conventional local DVR architectures.

These and/or other benefits provided by the disclosed exemplary systems and methods will be made apparent herein. Examples of media content recording, management, and distribution systems and methods will now be described in reference to the accompanying drawings.

FIG. 1 illustrates an exemplary media content distribution system 100 ("system 100") that includes a media content provider subsystem 102 ("provider subsystem 102") and a media content access subsystem 104 ("access subsystem 104") configured to communicate with one another by way of a network 106. Provider subsystem 102 may include or be implemented by one or more computing devices of one or more server-side computing systems controlled by (e.g., operated by) one or more service providers such as one or more media content distribution service providers. Access subsystem 104 may include or be implemented by one or more client-side computing devices controlled by (e.g., operated by) a user 108 (e.g., an end user of one or more services provided by provider subsystem 102). Examples of such devices, which may be referred to as "user devices" herein, may include, without limitation, a personal computer, a mobile phone device, a smart phone, a tablet computer, a set-top box device, a digital video recorder ("DVR") device, a gaming device, and any other computing device or combination of computing devices (e.g., computing devices of various device platforms) configured to access services and/or media content provided by provider subsystem 102.

Provider subsystem 102 and access subsystem 104 may communicate using any remote communications technologies suitable to support distribution of and access to services and/or media content provided by provider subsystem 102. Examples of such communication technologies include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), Hypertext Transfer Protocol ("HTTP"), Hypertext Transfer Protocol Secure ("HTTPS"), Ethernet, wireless communications technologies, media content transport technologies, media content streaming technologies, other suitable communications technologies, and any combination or sub-combination thereof.

Provider subsystem 102 may distribute, and access subsystem 104 may access, media content by way of network 106. Network 106 may include any network or combination of networks provided by one or more appropriately configured network devices (and communication links thereto) and over which communications and data (e.g., media content data) may be transported between provider subsystem 102 and access subsystem 104. For example, network 106 may include, but is not limited to, a mobile phone network (e.g., a cellular phone network, a 3G network, a 4G network, etc.), a satellite media network (e.g., a broadcasting network, a terrestrial media broadcasting network, etc.), a media content distribution network (e.g., a subscriber television network, a media broadcasting, multicasting, and/or narrowcasting network, etc.), a telecommunications network, the Internet, the World Wide Web, a wide area network, any other network capable of transporting communications and data between provider subsystem 102 and access subsystem 104, and/or any combination or sub-combination thereof.

Provider subsystem 102 may be configured to provide an online content management service for access by access subsystem 104 over network 106. Provider subsystem 102 may be further configured to record media content programs during transmission of the media content programs in accordance with a predefined transmission schedule, provide an online recording manager service through which users of access subsystem 104 may provide requests to obtain access to recorded media content programs, and publish recorded media content programs to the online media content management service for access by users. Users may utilize user devices included in or implementing access subsystem 104 to access the online content management service provided by provider subsystem 102 in order to access and/or manage recorded media content programs that have been published to the online media content management service and to which the users are entitled access.

Figure 2:
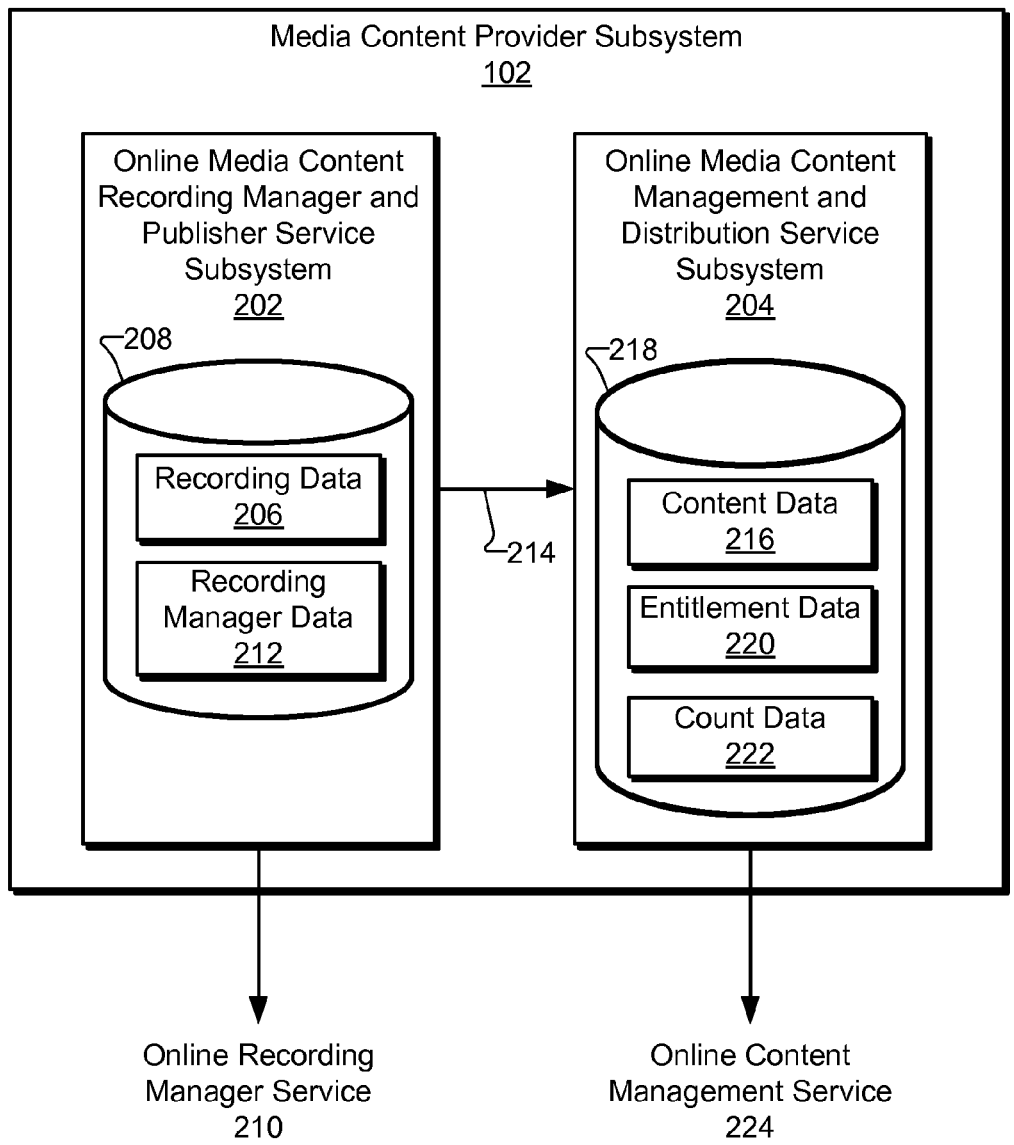
FIG. 2 illustrates exemplary components of a media content provider subsystem according to principles described herein.

To illustrate, FIG. 2 shows provider subsystem 102 to include an online media content recording manager and publisher service subsystem 202 ("recording service subsystem 202") and an online media content management and distribution service subsystem 204 ("management service subsystem 204"), which may communicate one with another using any suitable data communications technologies.

Recording service subsystem 202 may be configured to record media content programs during transmission of the media content programs in accordance with a predefined transmission schedule. Recording service subsystem 202 may receive transmissions of media content programs from one or more sources, such as one or more sources transmitting streams of media content programs in accordance with the predefined transmission schedule. In certain embodiments, the media content programs may include television content programs transmitted by one or more sources of live television content streams carrying the television content programs.

Recording service subsystem 202 may receive streams of media content programs from a source and record the media content programs carried by the streams over time. The recording of the media content programs may include storing recording data 206 representing the recorded media content programs to a data storage facility 208 included in recording service subsystem 202.

In certain embodiments, recording service subsystem 202 may be configured to record a plurality of media content programs transmitted by a source (e.g., all media content programs transmitted by the source) and to store recording data 206 representative of the recorded media content programs in data storage facility 208 for a predetermined, configurable length of time (e.g., for two days). After the predetermined length of time, recording service subsystem 202 may automatically remove the recording data 206 representing the recorded media content programs from data storage facility 208, which may allow data storage resources to be used to store more recent recordings of media content programs.

Recording service subsystem 202 may be configured to perform one or more operations on recorded media content programs. For example, recording service subsystem 202 may be configured to encrypt recorded media content programs. Additionally or alternatively, recording service subsystem 202 may be configured to tag recorded media content programs with unique identifiers. In certain embodiments, recording service subsystem 202 may be configured to generate a unique identifier for each recorded media content program based at least in part on information associated with the media content program and to tag each recorded media content program with the corresponding unique identifier. For example, recording service subsystem 202 may be configured to generate a unique identifier based on a channel identifier for a media content channel associated with a media content program, a program identifier for the media content program, and time information associated with a scheduled transmission time of the media content program. In embodiments in which the media content programs comprise television content programs, recording service subsystem 202 may be configured to generate a unique identifier based on a channel identifier for a television channel associated with a television content program, a television program identifier, and time information associated with a scheduled transmission time (e.g., a scheduled broadcast or multicast time) of the television content program.

Recording data 206 stored in data storage facility 208 may include data representative of the unique identifiers with which the recorded media content programs are tagged and relationships between the unique identifiers and the recorded media content programs. Recording data 206 may also include data representative of any other information associated with the recorded media content programs, including metadata associated with the recorded media content programs.

Recording service subsystem 202 may be configured to provide an online recording manager service 210 for access and use by a user to request to obtain access to recorded media content programs stored in data storage facility 208. As part of the online recording manager service 210, recording service subsystem 202 may provide a user interface with which a user may interact to initiate a request to record one or more media content programs. In certain embodiments, for example, a user interface provided by recording service subsystem 202 as part of the online recording manager service 210 may provide an electronic media program guide configured to present information representative of a predefined media content transmission schedule. In some examples, the media program guide may include a television program guide that presents information representative of a predefined television schedule. A user accessing the online recording manager service 210 may use the user interface and/or the media program guide information presented therein to initiate requests to record specific media content programs associated with specific predefined transmission timeslots and/or channels.

In this or an alternative manner, a user may provide input, through online recording manager service 210, to request that a media content program be recorded. In some examples, the request may include a request to schedule a future recording of a media content program in conjunction with transmission of the media content program in a future timeslot. In other examples, the request may include a request to initiate recording of a media content program that is currently being transmitted in accordance with the predefined transmission schedule. In other examples, the request may include a request to record a media content program that has already been transmitted during a past timeslot. In certain embodiments, recording service subsystem 202 may be configured to fulfill each of these types of recording requests.

Recording service subsystem 202 may store data representing recording requests as recording manager data 212 in data storage facility 208. Recording manager data 212 may represent recording requests, including requests to schedule past, present, and/or future recordings of media content programs.

In certain embodiments, recording service subsystem 202 may record received media content programs automatically as described above, regardless of whether or when requests to record the media content programs are received through online recording manager service 210. In such embodiments, the actual recording of media content programs by recording service subsystem 202 is not tied to recording requests initiated by users of online recording manager service 210. Because a user may provide recording requests for past, present, and/or future transmissions of media content programs, as described above, the actual recording of the media content programs may be performed by recording service subsystem 202 before and/or after a recording request is received from the user. If the recording request is for a past transmission of a media content program, recording service subsystem 202 receives the request after the actual recording of the media content program has already been performed. If the recording request is for a present transmission of a media content program, recording service subsystem 202 receives the request after the actual recording of the media content program has already started but has not yet completed (meaning that actual recording of the media content program occurs both before and after the request is received). If the recording request is for a future transmission of a media content program, recording service subsystem 202 receives the request before the actual recording of the media content program is performed.

In cases in which a recording request is to record a media content program that has already been recorded by and is currently stored by recording service subsystem 202, system 100 provides the user with a feature for obtaining access to previously recorded content. This may be referred to as "retroactive recording" and may allow a user to obtain "backdated" access to any media content program that has been aired (e.g., broadcast) and recorded within a predefined, configurable time window.

In response to a recording request initiated by a user to record a media content program, recording service subsystem 202 may publish a recording of the media content program identified by the request to management service subsystem 204 for access by the user. Arrow 214 shown in FIG. 2 represents a publishing of one or more recorded media content programs from recording service subsystem 202 to management service subsystem 204. This publishing of recorded media content from recording service subsystem 202 to management service subsystem 204 may also be referred to herein as a publishing, by recording service subsystem 202, to an online or hosted content management service provided by management service subsystem 204.

In certain embodiments, recording service subsystem 202 may conditionally publish a recorded media content program in response to a user request based on entitlement rights of the user. For example, recording service subsystem 202 may maintain or have access to data representative of user entitlement rights to media content programs recorded by recording service subsystem 202. The entitlement rights data may be in any suitable form, including subscription information specifying specific media content programs and/or channels that users are entitled to access.

Recording service subsystem 202 may receive a request initiated by a user to record a media content program. In response to the request, recording service subsystem 202 may determine, based on the entitlement rights data, whether the user is entitled to access the media content program. If recording service subsystem 202 determines that the user is not entitled to access the media content program, recording service subsystem 202 may refuse to publish the recorded media content program to management service subsystem 204 for access by the user. If, on the other hand, recording service subsystem 202 determines that the user is entitled to access the media content program, recording service subsystem 202 may publish the recorded media content program to management service subsystem 204.

Recording service subsystem 202 may be configured to publish a recorded media content program by providing an actual copy of the recorded media content program to management service subsystem 204, which may store the copy of the recorded media content program as hosted content data 216 in a data storage facility 218 included in management service subsystem 204. In certain embodiments, management service subsystem 204 may be configured to selectively store a recorded media content program received from recording service subsystem 202 such that management service subsystem 204 stores only a single copy of the same recorded media content program. To this end, when recording service subsystem 202 publishes a copy of a recorded media content program to management service subsystem 204, management service subsystem 204 may determine whether a copy of the same recorded media content program (e.g., a copy of the media content program recorded on the same channel and/or in the same timeslot of a predefined transmission schedule) is already stored in data storage facility 218 of management service subsystem 204.

The determination may be made in any suitable way, such as by searching data storage facility 218 for a match. In certain embodiments, management service subsystem 204 may be configured to search for a matching unique identifier. To illustrate, when recording service subsystem 202 publishes the media content program to management service subsystem 204, recording service subsystem 202 may provide the unique identifier generated by recording service subsystem 202 for the recorded media content program. Management service subsystem 204 may identify and use the unique identifier to search data storage facility 218 for a matching unique identifier. If a match is not found, management service subsystem 204 determines that the same recorded media content program is not already stored in data storage facility 218 of management service subsystem 204 and stores a copy of the recorded media content program and the unique identifier for the recorded media content program to data storage facility 218. If, on the other hand, a match is found, management service subsystem 204 determines that the same recorded media content program is already stored in data storage facility 218 of management service subsystem 204 and does not store an additional copy of the recorded media content program to data storage facility 218. In this or a similar manner, management service subsystem 204 may maintain only a single copy of each unique recorded media content program. This may support a highly scalable media content recording, management, and distribution architecture.

The publishing of a recorded media content program by recording service subsystem 202 to management service subsystem 204 may also include recording service subsystem 202 providing, to management service subsystem 204, entitlement data specifying user privileges to access the recorded media content program. Management service subsystem 204 may store the entitlement data for the media content program as entitlement data 220 in data storage facility 218. To illustrate, the publishing of the media content program to management service subsystem 204 may include recording service subsystem 202 providing a user identifier representing a user who is entitled to access the recorded media content program. The user associated with the user identifier may be the same user who initiated a request to record the media content program through online recording manager service 210, which request triggered the publishing of the media content program to management service subsystem 204. Accordingly, entitlement data 220 may indicate any users who are entitled to access a copy of a recorded media content program that is published to and stored by management service subsystem 204. The entitlement data 220 may include any other information configured to facilitate entitled user access to a recorded media content program. For example, entitlement data 220 may include license information and/or encryption/decryption keys associated with a recorded media content program and provided by recording service subsystem 202 in conjunction with the publishing of the recorded media content program to management service subsystem 204.

In certain embodiments, entitlement data 220 may represent relationships of users to recorded media content programs represented by content data 216. For example, based on entitlement data received from recording service subsystem 202 in conjunction with a publishing of a recorded media content program to management service subsystem 204, management service subsystem 204 may tag the recorded media content program with one or more user identifiers to indicate one or more particular users who are entitled to access the recorded media content program stored by management service subsystem 204.

Figure 3A:
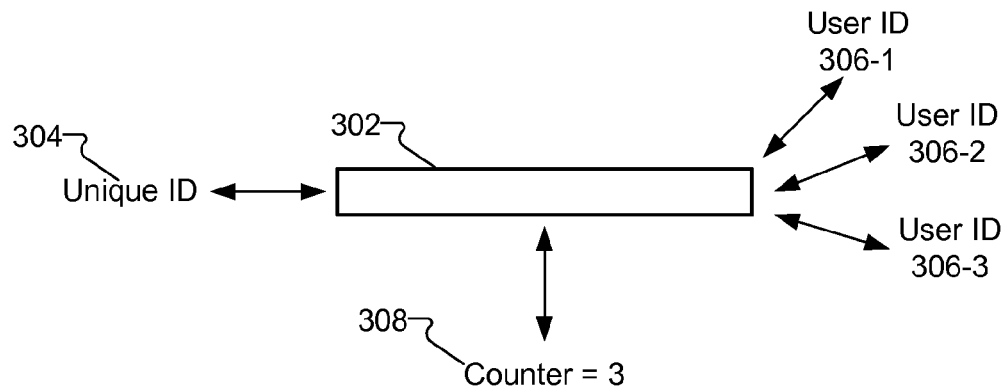
FIGS. 3A-3B illustrate examples of a recorded media content program tagged with multiple user identifiers according to principles described herein.
Figure 3B:
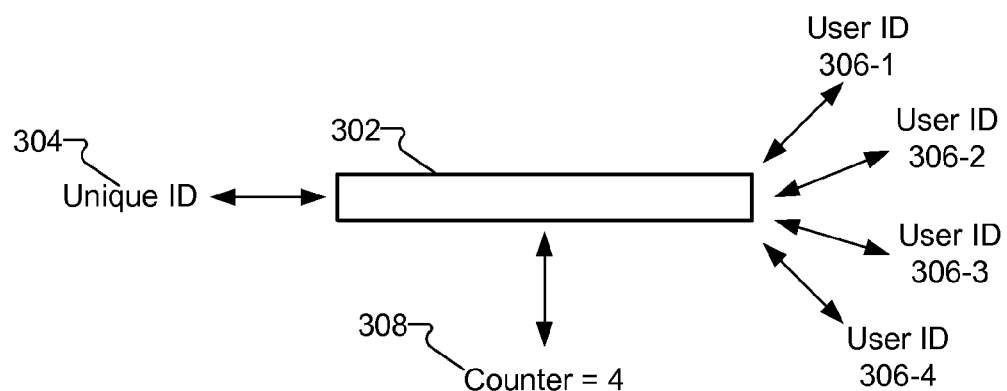

FIGS. 3A-3B illustrate examples of a recorded media content program 302 having a unique identifier 304 and associated with multiple user identifiers 306 to indicate that the users associated with the user identifiers 306 are entitled to access the recorded media content program 302. In FIG. 3A, three user identifiers 306-1 through 306-3 are associated with the recorded media content program 302 to indicate that three users corresponding to the user identifiers 306-1 through 306-3 are entitled to access the recorded media content program 302.

If an additional user requests, through the online recording manager service 210, to record the recorded media content program 302, recording service subsystem 202 may receive the request and respond by publishing the recorded media content program 302 to management service subsystem 204 as described above. Management service subsystem 204 may determine that a copy of the recorded media content program 302 is already stored in data storage facility 218 and elect, based on this determination, not to store an additional copy of the recorded media content program 302 to data storage facility 218, such as described above. Instead, management service subsystem 204 may identify the existing copy of the recorded media content program 302 in data storage facility 218 and, as illustrated in FIG. 3B, associate an additional user identifier 306-4 associated with the user who initiated the request to the recorded media content program 302 to indicate that the additional user is entitled to access the recorded media content program 302 stored in data storage facility 218.

Returning to FIG. 2, management service subsystem 204 may be configured to maintain count data 222 for each recorded media content program published by recording service subsystem 202 to management service subsystem 204 and stored in data storage facility 218. The count data 222 may indicate a number of different users entitled to access each recorded media content program. To illustrate, FIG. 3A shows a counter 308 indicating that three users (i.e., users associated with user identifiers 306-1 through 306-3) are entitled to access the recorded media content program 302. When management service subsystem 204 associates user identifier 306-4 with the recorded media content program 302, as described above, management service subsystem 204 may increment counter 308 to indicate that four users (i.e., users associated with user identifiers 306-1 through 306-4) are entitled to access the recorded media content program 302, as shown in FIG. 3B.

Returning again to FIG. 2, management service subsystem 204 may be configured to provide users access to and/or tools for managing recorded media content programs that have been published to management service subsystem 204 and to which the users are entitled access. Management service subsystem 204 may provide the access and tools by way of an online content management service 224, which management service subsystem 204 may provide for access and use by the users. Through the online content management service 224, users may upload content (e.g., media content and/or other digital content) from user devices for hosted storage by management service subsystem 204, manage the hosted content (e.g., organize, edit, delete, etc. the hosted content), and access the hosted content (e.g., play back or otherwise present the hosted content) for experiencing by the users. Hence, online content management service 224 may comprise a hosted content management service (e.g., cloud-storage-based content management service) that allows users of the service to upload, manage, and access digital content hosted by management service subsystem 204 and to which the users are entitled access.

Recorded media content programs published by recording service subsystem 202 to management service subsystem 204 as described herein may be included in the content hosted by management service subsystem 204 as part of the online content management service 224. Accordingly, a user of the online content management service 224 may access any recorded media content programs hosted by management service subsystem 204 and to which the user is entitled access. For example, through the online content management service 224, the user may access and play back, with a user device, any recorded media content program hosted by management service subsystem 204 and to which the user is entitled access.

Online content management service 224 may be accessed through various user devices and/or user device platforms. This may allow a user to use any of a variety of user devices and/or user device platforms (e.g., mobile phone devices, tablet computers, personal computers, etc.) to provide an access request to access and play back a recorded media content program by way of the online content management service 224. Accordingly, by publishing recorded media content programs to management service subsystem 204 such that the recorded media content programs are accessible through the online content management service 224, the accessibility of the recorded media content programs may be enhanced as compared to conventional media content recording architectures.

As mentioned, a user may upload content from a user device to management service subsystem 204 through the online content management service 224. Rather than uploading recorded media content programs from a user device as a user may do for other content, however, the user may access and use the online recording manager service 210 provided by recording service subsystem 202 to provide requests to record media content programs. Recording service subsystem 202 may receive the requests and respond by publishing the recorded media content programs and appropriate entitlement data to management service subsystem 204, as described herein, such that the recorded media content programs are hosted by management service subsystem 204 as part of the online content management service 224. The user may then go through the online content management service 224 to access the hosted, recorded media content programs.

Through the online content management service 224, users may manage the recorded media content programs hosted by management service subsystem 204. For example, after a user has played back a recorded media content program by way of the online content management service 224, the user may provide user input indicating that the user wants to delete the recorded media content program from the user's collection of content stored in hosted storage. Management service subsystem 204 may receive the user input and respond by disassociating the user from the recorded media content program in hosted storage. The disassociation may be performed in any suitable way, such as by disassociating a user identifier for the user from the recorded media content program. After the disassociation is performed, the user is no longer entitled to access the recorded media content program through the online content management service 224, and, from the user's perspective, the recorded media content program is no longer included in the user's collection of hosted content. Management service subsystem 204 may continue to maintain a copy of the recorded media content program for access by any other users entitled to access the recorded media content program.

When a user deletes a recorded media content program from the user's hosted collection of digital content, management service subsystem 204 may adjust count data 222 for the recorded media content program. For example, referring to FIG. 3B, if a user associated with user identifier 306-4 elects to delete recorded media content program 302 from the user's hosted content collection, management service subsystem 204 may disassociate user identifier 306-4 from the recorded media content program 302 and decrement counter 308. As a result of these operations, the hosted data would appear as shown in FIG. 3A.

In certain embodiments, management service subsystem 204 may be configured to determine when count data 222 specifies that no users are entitled to access a recorded media content program by way of the online content management service 224 and, in response to the determination, delete data representative of the recorded media content program from hosted storage of the online content management service 224. For example, if all users entitled to access recorded media content program 302 provide delete requests indicating that the users want to delete the recorded media content program 302 from their content collections, management service subsystem 204 may update entitlement data 220 to disassociate the users from the recorded media content program 302 as described above and decrement counter 308 to reflect the changes. Counter 308 will then indicate that no users are entitled to access recorded media content program 302. Management service subsystem 204 may detect this and, in response, delete data representative of recorded media content program 302 from content data 216 in data storage facility 218.

In certain embodiments, provider subsystem 102 may be configured to support sharing and/or gifting features that allow a user to share and/or gift a recorded media content program hosted by management service subsystem 204 with one or more additional users. For example, through the online content management service 224, a user may provide a share request to indicate that the user wants to share a recorded media content program hosted by management service subsystem 204 and to which the user is entitled access with an additional user. Management service subsystem 204 may receive the share request and determine whether the additional user is entitled to access the recorded media content program. This determination may be made in any suitable way, including by management service subsystem 204 using entitlement data, subscriber and/or subscription data, and/or other data maintained by management service subsystem 204 or accessed from recording service subsystem 202 to determine whether the user is entitled to access the recorded media content program and/or a channel associated with the recorded media content program.

If management service subsystem 204 determines that the additional user is entitled to access the recorded media content program, management service subsystem 204 may share the recorded media content program with the additional user. The sharing may include management service subsystem 204 updating entitlement data 220 to specify that the additional user is entitled to access the recorded media content program by way of the online content management service 224 (e.g., by associating a user identifier for the additional user with the recorded media content program in the entitlement data 220).

If, on the other hand, management service subsystem 204 determines that the additional user is not entitled to access the recorded media content program, management service subsystem 204 may prompt the user to gift the recorded media content program to the additional user by paying a fee to share the recorded media content program with the additional user. The user may pay the fee in any suitable way. After payment of the fee, management service subsystem 204 may share the recorded media content program with the additional user, such as by updating entitlement data 220 to specify that the additional user is entitled to access the recorded media content program by way of the online content management service 224 (e.g., by associating a user identifier for the additional user with the recorded media content program in the entitlement data 220).

In certain embodiments, online recording manager service 210 and online content management service 224 are separate and distinct services, each of which may be accessed separately and independently by access subsystem 104. Online recording manager service 210 and online content management service 224 may be provided by the same or different service providers.

Returning to FIG. 1, access subsystem 104 may be configured to access online recording manager service 210 and online content management service 224 over network 106. Accordingly, a user of access subsystem 104 may provide recording requests through online recording manager service 210 to initiate publication, by recording service subsystem 202, of recorded media content programs to management service subsystem 204. Management service subsystem 204 may host the recorded media content programs and provide the user of access subsystem 104 with access to the hosted, recorded media content programs through online content management service 224, as described herein. The access to the hosted, recorded media content programs may allow the user to play back, share, gift, delete, and/or otherwise manage the hosted, recorded media content programs, such as described herein. Access to the hosted, recorded media content programs through the online content management service 224 may allow the user time-shifted and/or place-shifted access from a variety of different user devices and/or user device platforms.

Figure 4:
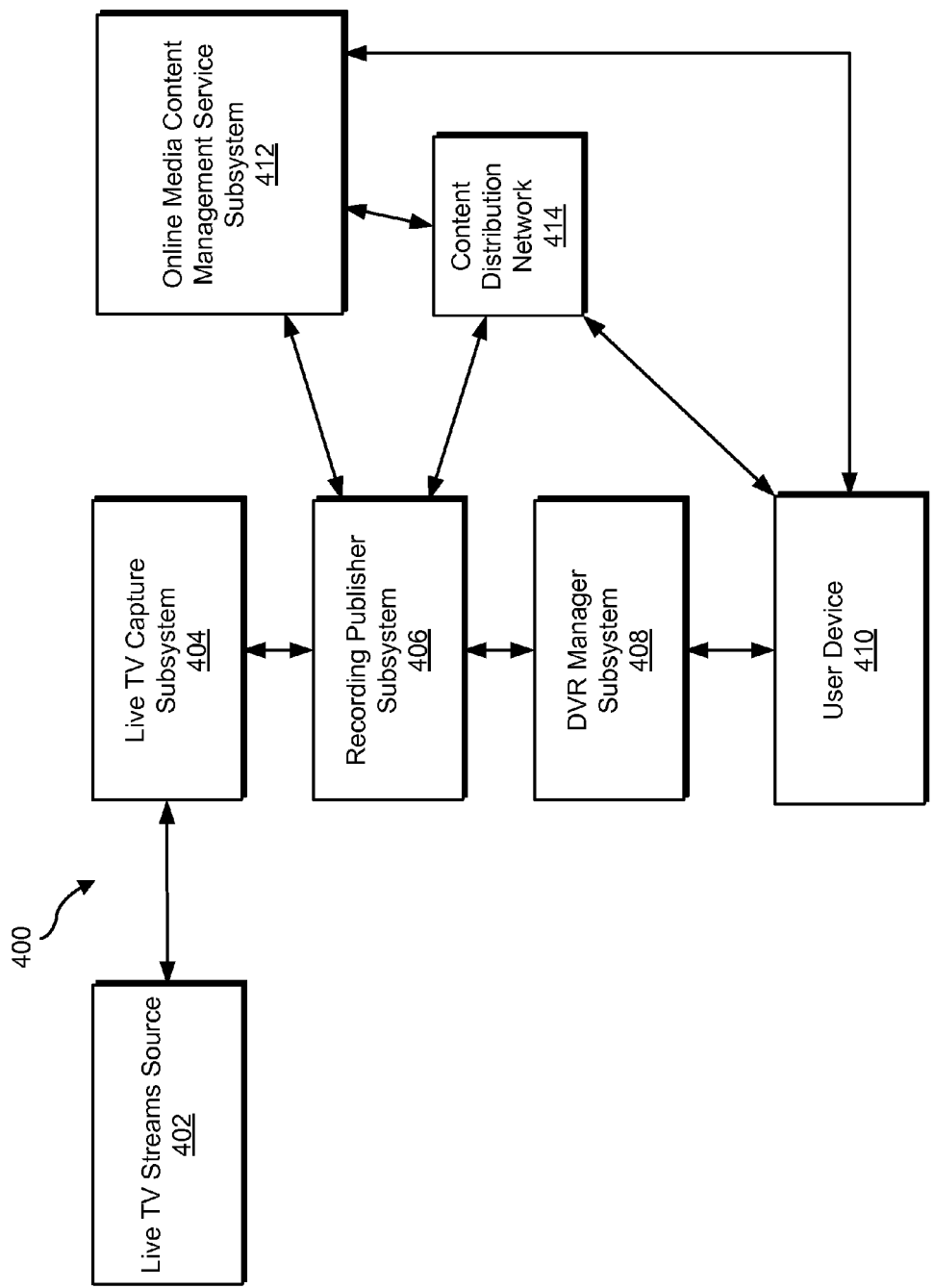
FIG. 4 illustrates another exemplary media content distribution system according to principles described herein.

FIG. 4 illustrates another exemplary media content distribution system 400 ("system 400"). In certain embodiments, system 400 may be an implementation of system 100. For example, one or more components of system 400 may be included in one or more components of system 100.

System 400 may include a live television ("TV") streams source 402 ("source 402"), a live television capture subsystem 404 ("capture subsystem 404"), a recording publisher subsystem 406 ("publisher subsystem 406"), a digital video recorder ("DVR") manager subsystem 408 ("manager subsystem 408"), a user device 410, an online media content management service subsystem 412 ("management service subsystem 412"), and a content distribution network ("CDN") 414 communicatively coupled as shown in FIG. 4. Any suitable communications technologies may be employed to support communications between the components of system 400. In certain embodiments in which system 400 is an implementation of system 100, capture subsystem 404, publisher subsystem 406, and manager subsystem 408 may be included in or implement recording service subsystem 202, management service subsystem 412 and content distribution network 414 may be included in or implement management service subsystem 204, and user device 410 may be included in or implement access subsystem 104.

Capture subsystem 404 may be configured to receive live television content streams carrying live television content programs from source 402. Source 402 may include any suitable source of live television content. For example, source 402 may include one or more components of a subscriber television network, such as a super head-end facility, a head-end facility, a video hub office ("VHO") facility, a video service facility ("VSO"), a television content broadcast facility, and/or a satellite broadcast facility. In certain embodiments, source 402 may include the same source from which a subscriber television content provider obtains television content that the subscriber television content provider distributes to subscribers of a live television content distribution service (e.g., a cable or satellite subscriber television service). In certain embodiments, the streams of television content programs provided by source 402 may be associated with television channels.

Capture subsystem 404 may capture the live television content streams carrying live television content programs received from source 402. The capture may include recording streams of live television content programs over time, including storing data representative of the recorded television content programs to data storage within capture subsystem 404. In certain embodiments, capture subsystem 404 may store recorded media content programs in memory for a predetermined length of time, after which capture subsystem 404 may delete the recorded media content programs from its data storage. In certain embodiments, capture subsystem 404 may continuously record channel streams of live television content programs for all channels provided by source 402.

The capturing may include further processing recorded television content programs. For example, the capturing may include encrypting the recorded television content programs and/or tagging the recorded television content programs with unique identifiers, such as described herein.

In certain embodiments, capture subsystem 404 may include or be implemented by one or more components of a subscriber television network, such as a super head-end facility, a head-end facility, a VHO facility, a VSO, and/or a television content broadcast facility.

Manager subsystem 408 may be configured to provide an online DVR manager service for access by user device 410. Through the service, manager subsystem 408 may provide a television program guide and/or one or more tools for use by a user to manage a DVR recording schedule. Accordingly, through the service, a user of user device 410 may provide input to initiate a request to record a television content program. Manager subsystem 408 may receive and notify publisher subsystem 406 of the request to record a television content program. In response to the notification, publisher substance system 406 may communicate with capture subsystem 404 to obtain a copy of the requested television content program, which has been recorded and stored by capture subsystem 404 as described herein.

Publisher subsystem 406 may then publish the television content program, along with appropriate user entitlement data (e.g., user identifier data identifying the user who initiated the request to record the television content program), the unique identifier for the recorded television content program, and/or any other related data, for hosting by an online content management service provided by management service subsystem 412 and content distribution network 414. In certain embodiments, the publishing may include publisher subsystem 406 providing the entitlement data, unique identifier data, and/or other related data to management service subsystem 412.

Management service subsystem 412 may be configured to receive and maintain the data and/or any other information that may be used to selectively provide access to the published television content program only to users entitled to access the television content program. For example, management service subsystem 412 may be configured to maintain account data representative of user accounts (e.g., subscriber and/or subscription account data), user device data representative of one or more user devices registered with management service subsystem 412 and/or associated with user accounts, entitlement data representative of user entitlements to specific television content programs, digital rights management data representative of digital rights associated with television content programs, and recordings information data representative of a catalogue of recorded television content programs published to and hosted by management service subsystem 412.

The publishing of the television content program by publisher subsystem 406 may further include providing a copy of the television content program to content distribution network 414. In certain embodiments, publisher subsystem 406 may be configured to selectively provide a copy of the television content program to content distribution network 414 only when the content distribution network 414 does not already have a copy of the same television content program stored therein. For example, publisher subsystem 406 may publish data (e.g., a unique identifier for the television content program) to management service subsystem 412, which may be configured to search a catalogue of recorded television content programs hosted by management service subsystem 412 for a matching television content program. If a match is found, management service subsystem 412 may notify publisher subsystem 406, which may respond by not providing a copy of the recording of the television content program to content distribution network 414. In such examples, the publishing of the television content program includes only publishing data to management service subsystem 412. On the other hand, if a match is not found, management service subsystem 412 may notify publisher subsystem 406, which may then elect to provide a copy of the recording of the television content program to content distribution network 414 for hosted storage and distribution by content distribution network 414 to user device 410 associated with a user entitled to access the television content program.

In alternative embodiments, publisher subsystem 406 may be configured to provide a copy of a television content program to content distribution network 414 as part of publishing the television content program. Content distribution network 414 may be configured to selectively store or not store the television content program. For example, management service subsystem 412 may use data received from publisher subsystem 406 as part of the publishing to search a catalogue of recorded television content programs hosted by management service subsystem 412 to determine whether content distribution network 414 already contains a copy of the same television content program. Management service subsystem 412 may notify content distribution network 414 of the result of the search such that content distribution network 414 may elect to store a copy of the television content program received from publisher subsystem 406 if the same television content program is not already stored by content distribution network 414, or not to store a copy of the television content program received from publisher subsystem 406 because content distribution network 414 already contains a copy of the same television content program.

Management service subsystem 412 and content distribution network 414 may be configured to provide an online content management service that may be accessed by a user through user device 410. Through the service, a user of user device 410 may access recorded television content programs published to and hosted by the online content management service and to which the user is entitled access. For example, the user of user device 410 may want to play back a recorded television content program. The user may utilize user device 410 to access the online content management service provided by management service subsystem 412 and content distribution network 414. Through the service, the user may provide input to request that the recorded television content program be played back by user device 410. User device 410 may transmit the request to management service subsystem 412, which may receive the request, verify that the user is entitled to access the recorded television content program, use data (e.g., entitlement data, usage rights data, etc.) maintained by management service subsystem 412 to generate an appropriate access license for the recorded television content program, and provide the license, appropriate decryption keys, and/or any other information (e.g., an address at which the recorded television content program may be accessed within content distribution network 414) configured to allow the user device 410 to access the recorded television content program. User device 410 may receive the license and/or other access data from management service subsystem 412 and use the data to send a request to access the recorded television content program to content distribution network 414. Content distribution network 414 may receive the request and distribute the recorded television content program to user device 410. Content distribution network 414 may employ any suitable technologies for distributing digital content over a network for access by one or more user devices. For example, content distribution network 414 may be configured to stream and/or download digital content to one or more user devices.

Figure 5:
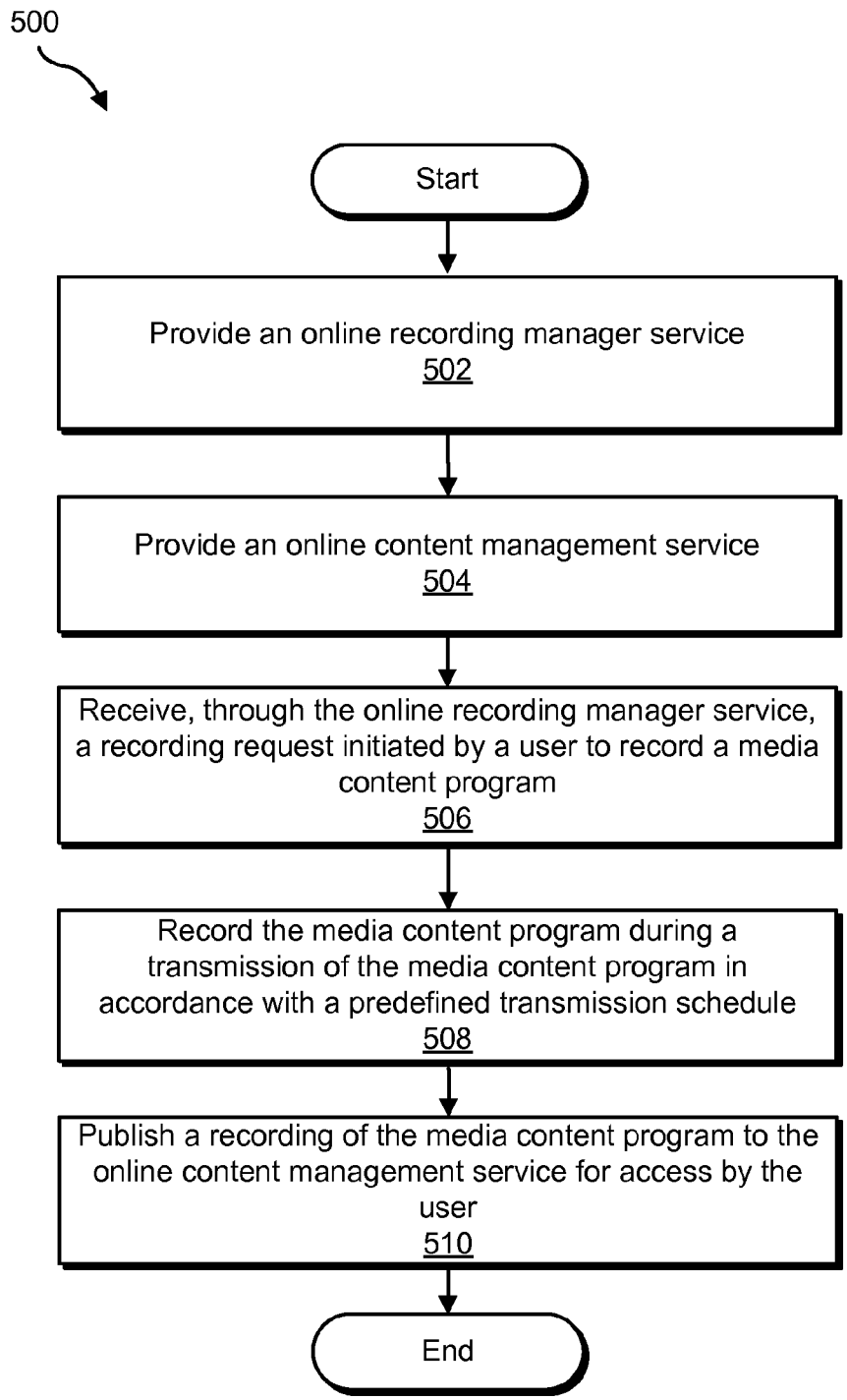
FIGS. 5-6 illustrate exemplary methods of recording, managing, and distributing media content according to principles described herein.
Figure 6:
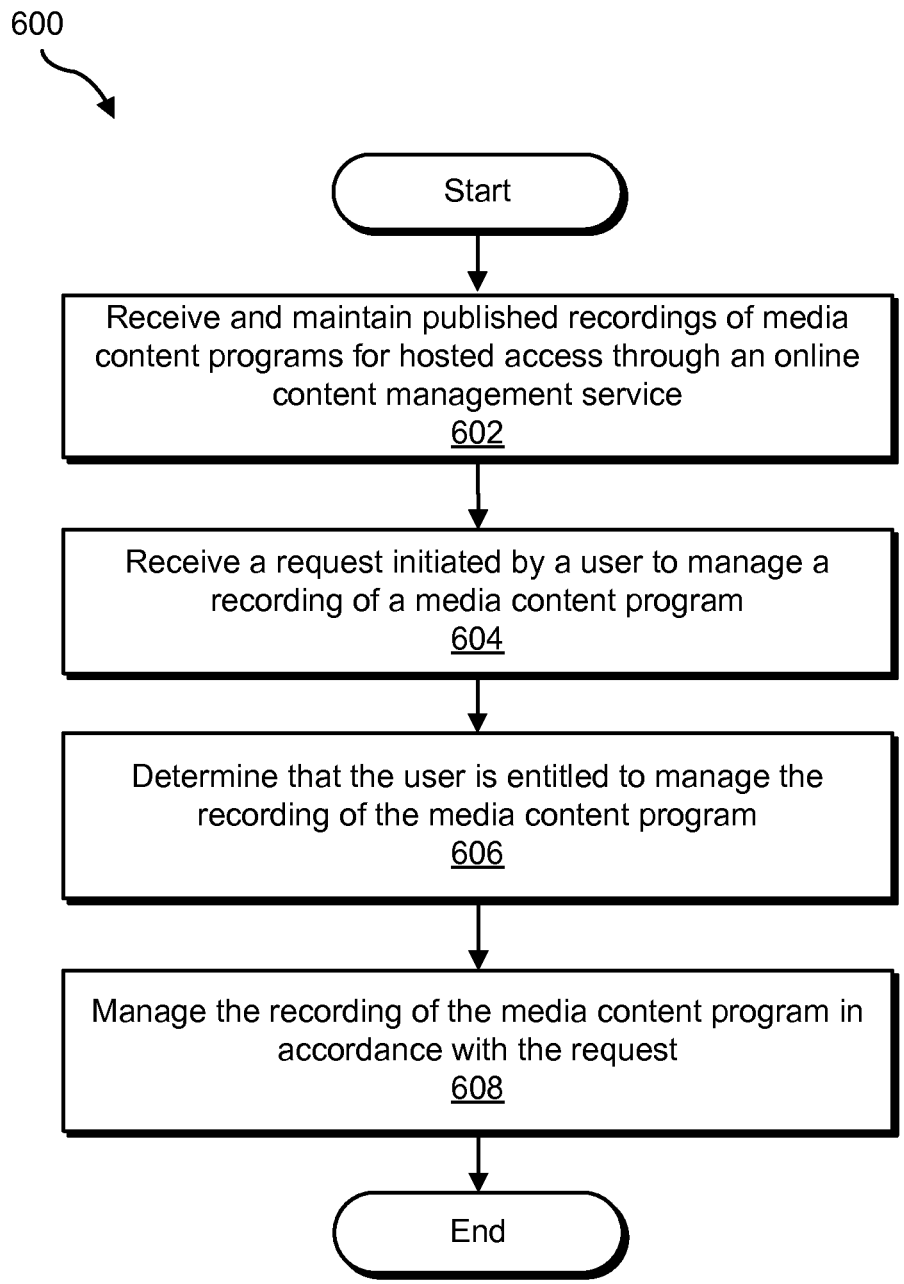

FIGS. 5 and 6 illustrate exemplary media content recording, management, and distribution methods 500 and 600, respectively. While FIGS. 5 and 6 illustrate exemplary steps according to certain embodiments, other embodiments may omit, add to, reorder, combine, and/or modify any of the steps shown in FIGS. 5 and 6. In certain embodiments, one or more of the steps shown in FIGS. 5 and/or 6 may be performed by provider subsystem 102, recording service subsystem 202, management service subsystem 204, and/or one or more components of system 400.

Turning to FIG. 5, in step 502, provider subsystem 102 provides an online recording manager service for access by a user, such as described herein.

In step 504, provider subsystem 102 provides an online content management service for access by the user, such as described herein.

In step 506, provider subsystem 102 receives, through the online recording manager service, a recording request initiated by the user to record a media content program, such as described herein.

In step 508, provider subsystem 102 records the media content program during a transmission of the media content program in accordance with a predefined transmission schedule. As described herein, the recording in step 508 may be performed before and/or after the receipt of the recording request in step 506.

In step 510, provider subsystem 102 publishes a recording of the media content program to the online content management service for access by the user through the online content management service, such as described herein.

Turning to FIG. 6, in step 602, provider subsystem 102 receives and maintains a published recording of a media content program for hosted access through an online content management service. Step 602 may be performed in response to a publishing of the recording of the media content program to the online content management service as described in step 510 of FIG. 5.

In step 604, provider subsystem receives a request initiated by a user to manage the recording of the media content program. As described herein, the request may be received by provider subsystem 102 through the online content management service provided by provider subsystem 102.

In step 606, provider subsystem 102 determines that the user is entitled to manage the recording of the media content program. The determination may be made in any of the ways described herein, including based on entitlement data published to and maintained by provider subsystem 102, such as described herein.

In step 608, provider subsystem 102 manages the recording of the media content program in accordance with the request. Step 608 may include provider subsystem 102 performing one or more operations to manage the recording of the media content program in accordance with the request. For example, if the request received in step 604 is an access request, then in step 608, provider subsystem 102 may perform one or more operations to distribute the recording of the media content program for access by a user device associated with the user. As another example, if the request received in step 604 is a delete request, then in step 608, provider subsystem 102 may perform one or more operations to disassociate the user from the recording of the media content program in hosted entitlement data and/or to delete the recording of the media content program from hosted storage, such as described herein. As another example, if the request received in step 604 is a share request, then in step 608, provider subsystem 102 may perform one or more operations to share and/or facilitate gifting of the recording of the media content program to one or more additional users, such as described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 7:
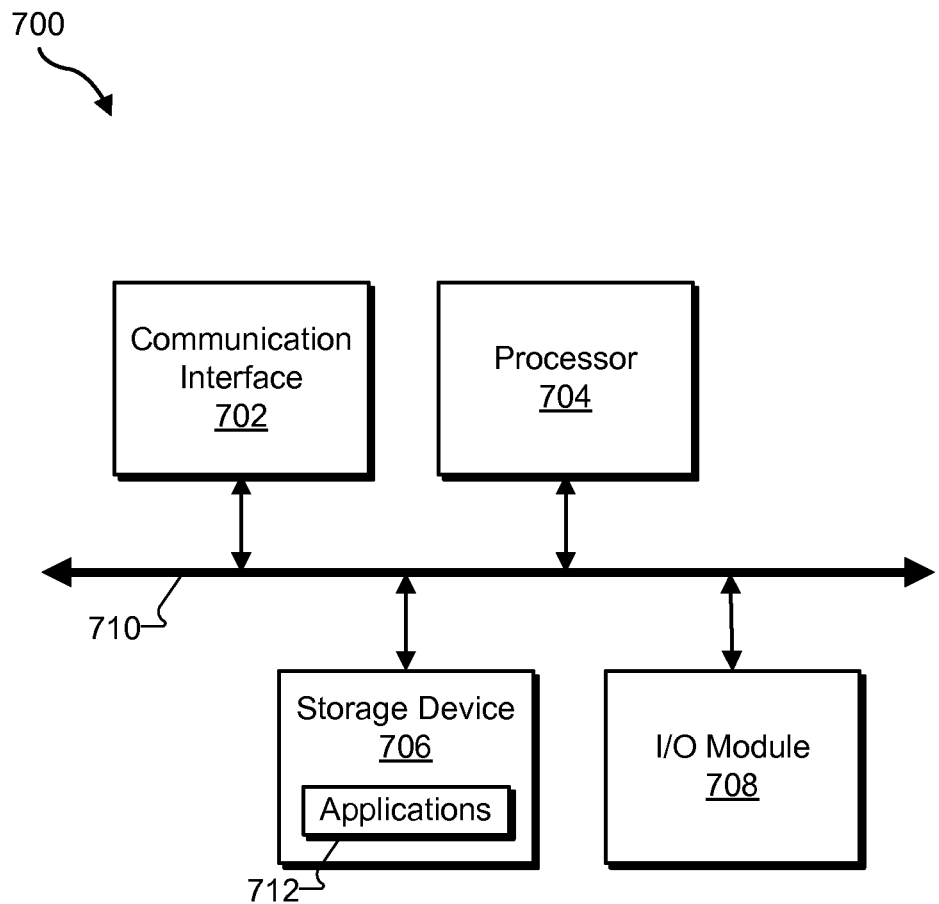
FIG. 7 illustrates an exemplary computing device according to principles described herein.

FIG. 7 illustrates an exemplary computing device 700 that may be configured to perform one or more of the processes described herein. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, and any other suitable interface. Communication interface 702 may additionally or alternatively provide such a connection through, for example, a local area network (such as an Ethernet network), a personal area network, a telephone or cable network, a satellite data connection, a dedicated URL, an Internet access network, or any other suitable connection. Communication interface 702 may be configured to interface with any suitable communication media, protocols, and formats.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another non-transitory computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 706. For example, data representative of one or more executable applications 712 (which may include, but are not limited to, one or more of the software applications described herein) configured to direct processor 704 to perform any of the operations described herein may be stored within storage device 706. In some examples, data may be arranged in one or more databases residing within storage device 706.

I/O module 708 may be configured to receive user input and provide user output and may include any hardware, firmware, software, or combination thereof supportive of input and output capabilities. For example, I/O module 708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the subsystems, facilities, and/or other components of systems described herein may be implemented by or within one or more components of computing device 700. For example, one or more applications 712 residing within storage device 706 may be configured to direct processor 704 to perform one or more processes or functions associated with one or more of the subsystems described herein. Likewise, one or more of the storage facilities described herein may be implemented by or within storage device 706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a media content provider subsystem, an online recording manager service for access by a user;
providing, by the media content provider subsystem, an online content management service for access by the user;
receiving, by the media content provider subsystem through the online recording manager service, a recording request initiated by the user to record a television content program;
publishing, by the media content provider subsystem in response to the recording request received through the online recording manager service, data representative of a recording of the television content program to the online content management service for hosted storage, access by the user, and distribution through the online content management service, wherein the publishing comprises providing entitlement data to the online content management service, the entitlement data specifying that the user is entitled to access the recording of the television content program;
receiving, by the media content provider subsystem by way of the online content management service, a delete request initiated by the user to delete the recording of the television content program from a collection of digital content associated with the user in the online content management service;
dissociating, by the media content provider subsystem in response to the delete request, the recording of the television content program hosted by the online content management service from the user by updating the entitlement data to specify that the user is no longer entitled to access the recording of the television content program by way of the online content management service; and
maintaining, by the media content provider subsystem after updating the entitlement data, the recording of the television content program hosted by the online content management service.

2. The method of claim 1, further comprising:
recording, by a media content provider subsystem, the television content program during a transmission of the television content program in accordance with a television schedule;
wherein the recording is performed before the receiving of the recording request.

3. The method of claim 1, further comprising:
generating, by the media content provider subsystem, a unique identifier for the recording of the television content program;
wherein the publishing further comprises providing data representative of the unique identifier to the online content management service.

4. The method of claim 3, wherein the unique identifier is generated based on a channel identifier of a channel associated with the television content program, a program identifier for the television content program, and time information associated with a transmission of the television content program in accordance with a television schedule.

5. The method of claim 1, further comprising:
receiving, by the media content provider subsystem by way of the online content management service, an access request initiated by an additional user to access the recording of the television content program through the online content management service;
determining, by the media content provider subsystem based on the entitlement data, that the additional user is entitled to access the recording of the television content program by way of the online content management service; and
distributing, by the media content provider subsystem by way of the online content management service, the recording of the television content program to a user device associated with the additional user for playback by the user device.

6. The method of claim 1, further comprising:
receiving, by the media content provider subsystem, a share request initiated by the user to share the recording of the television content program with an additional user by way of the online content management service;
determining, by the media content provider subsystem, that the additional user is not entitled to access the recording of the television content program;
prompting, by the media content provider subsystem in response to the determining that the additional user is not entitled to access the recording of the television content program, the user to pay a fee to share the recording of the television content program with the additional user by way of the online content management service; and
sharing, by the media content provider subsystem after payment of the fee by the user, the recording of the television content program with the additional user by way of the online content management service by updating the entitlement data to specify that the additional user is entitled to access the recording of the television content program by way of the online content management service.

7. The method of claim 1, further comprising maintaining, by the media content provider subsystem, count data specifying a number of users entitled to access the recording of the television content program by way of the online content management service.

8. The method of claim 7, further comprising:

determining, by the media content provider subsystem, when the count data specifies that no users are entitled to access the recording of the television content program by way of the online content management service; and deleting, by the media content provider subsystem in response to the determination, the data representative of the recording of the television content program from the hosted storage of the online content management service.

9. The method of claim 1, wherein the online recording manager service comprises a remote digital video recorder ("DVR") manager service.

10. The method of claim 1, embodied as computer-executable instructions on at least one non-transitory computer-readable medium.

11. A method comprising:

recording, by a media content provider subsystem, a television content program during a transmission of the television content program in accordance with a television schedule;

receiving, by the media content provider subsystem through an online recording manager service provided by the media content provider subsystem, a recording request initiated by a user to record the television content program;

publishing, by the media content provider subsystem in response to the recording request, data representative of the recorded television content program to a media content management and distribution subsystem for hosted storage, access by the user, and distribution through an online content management service provided by the media content management and distribution subsystem, wherein the publishing comprises providing entitlement data to the online content management service, the entitlement data specifying that the user is entitled to access the recording of the television content program;

receiving, the media content provider subsystem by way of the online content management service, a delete request initiated by the user to delete the recording of the television content program from a collection of digital content associated with the user in the online content management service;

dissociating, by the media content provider subsystem in response to the delete request, the recording of the television content program hosted by the online content management service from the user by updating the entitlement data to specify that the user is no longer entitled to access the recording of the television content program by way of the online content management service; and maintaining, by the media content provider subsystem after updating the entitlement data, the recording of the television content program hosted by the online content management service.

12. The method of claim 11, further comprising:

generating, by the media content provider subsystem, a unique identifier for the recorded media content program;

wherein the publishing further comprises providing data representative of the unique identifier to the media content management and distribution subsystem.

13. The method of claim 12, wherein the unique identifier is generated based on a channel identifier of a channel associated with the television content program, a program identifier for the television content program, and time information associated with the transmission of the television content program in accordance with the television schedule.

14. The method of claim 11, wherein the online recording manager service comprises a remote digital video recorder ("DVR") manager service.

15. The method of claim 11, embodied as computer-executable instructions on at least one non-transitory computer-readable medium.

16. A system comprising:

a capture subsystem that records a plurality of television content programs during transmission of the television content programs in accordance with a television schedule;

a recording publisher subsystem communicatively coupled to the capture subsystem and that receives a notification of a recording request initiated by a user to record a television content program included in the plurality of television content programs, retrieves, in response to the notification of the recording request, a copy of a recording of the television content program from the capture subsystem, publishes, in response to the notification of the recording request, data representative of a recording of the television content program to an online content management service for hosted storage, access by the user, and distribution through the online content management service, wherein the publishing comprises providing entitlement data to the online content management service, the entitlement data specifying that the user is entitled to access the recording of the television content program; and a management service subsystem communicatively coupled to the recording publisher subsystem and that receives, by way of the online content management service, a delete request initiated by the user to delete the recording of the television content program from a collection of digital content associated with the user in the online content management service, dissociates, in response to the delete request, the recording of the television content program hosted by the online content management service from the user by updating the entitlement data to specify that the user is no longer entitled to access the recording of the television content program by way of the online content management service, and maintains, after updating the entitlement data, the recording of the television content program hosted by the online content management service.

17. The system of claim 16, wherein the recording publisher subsystem further provides a remote digital video recorder ("DVR") manager service through which the recording request is received from the user.

18. A system comprising:

a media content provider subsystem that provides a hosted content management service, provides a recording manager service for access by a user, receives, through the recording manager service, a recording request initiated by the user to record a television content program, publishes, in response to the recording request received through the recording manager service, data representative of a recording of the television content program to the hosted content management service for hosted storage, access by the user, and distribution through the hosted content management service, wherein the publishing comprises providing entitlement data to the hosted content management service, the entitlement data specifying that the user is entitled to access the recording of the television content program, receives, by way of the hosted content management service, a delete request initiated by the user to delete the recording of the television content program from a collection of digital content associated with the user in the hosted content management service, dissociates, in response to the delete request, the recording of the television content program hosted by the hosted content management service from the user by updating the entitlement data to specify that the user is no longer entitled to access the recording of the television content program by way of the hosted content management service, and maintains, after updating the entitlement data, the recording of the television content program hosted by the hosted content management service.

19. The system of claim 18, wherein:
the media content provider subsystem records the television content program during a transmission of the television content program in accordance with a television schedule; and
the recording is performed at least one of before and after the receipt of the recording request.

20. The system of claim 18, wherein the media content provider subsystem
receives, by way of the hosted content management service, an access request initiated by an additional user to access the recording of the television content program through the hosted content management service,
determines that the additional user is entitled to access the recording of the television content program by way of the hosted content management service, and
distributes the recording of the television content program to a user device associated with the additional user for playback by the user device.

21. The method of claim 1, wherein the online content management service comprises a cloud-based content management service.

* * * * *